United States Patent
Kishida

(10) Patent No.: US 6,614,464 B2
(45) Date of Patent: Sep. 2, 2003

(54) LASER SCANNING APPARATUS, IMAGE FORMING APPARATUS, AND METHOD FOR STARTING LASER SCANNING APPARATUS

(75) Inventor: Tetsuo Kishida, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/883,309

(22) Filed: Jun. 19, 2001

(65) Prior Publication Data

US 2002/0005889 A1 Jan. 17, 2002

(30) Foreign Application Priority Data

Jun. 23, 2000 (JP) .................................. 2000-189499

(51) Int. Cl.⁷ .............................................. B41J 2/435
(52) U.S. Cl. ...................................................... 347/250
(58) Field of Search .................................. 347/250, 235, 347/225, 234, 248; 355/157, 216

(56) References Cited

U.S. PATENT DOCUMENTS 5,138,479 A * 8/1992 Ando ........................ 359/216
5,541,637 A * 7/1996 Ohashi et al. ............. 347/248
6,064,419 A   5/2000 Uchiyama .................. 347/250
6,247,647 B1 * 6/2001 Courtney et al. ........ 235/462.36
6,262,759 B1   7/2001 Akiyama et al. .......... 347/250

FOREIGN PATENT DOCUMENTS

JP          8-2001        1/1996
JP          8-183198      7/1996

* cited by examiner

*Primary Examiner*—Michael Nghiem
(74) *Attorney, Agent, or Firm*—Fitzpatrick, Cella, Harper & Scinto

(57) ABSTRACT

A laser scanning apparatus, can suppress the unnecessary emission of a laser beam for a photosensitive drum, can prevent the degradation of the photosensitive drum, and can prolong the life time of a laser, using simple configuration. An image forming apparatus includes this laser scanning apparatus, and a method for starting the laser scanning apparatus. A laser scanning apparatus performing exposure with a laser beam predicts a time elapsing until completion of start on the basis of initial start conditions, shuts off the laser beam during the time predicted, emits a laser beam after the time predicted elapses, and detects completion of start.

7 Claims, 7 Drawing Sheets

LASER SCANNING APPARATUS, IMAGE FORMING APPARATUS, AND METHOD FOR STARTING LASER SCANNING APPARATUS

BACKGROUND OF THE INVENTION

1. Field of the Invention

The present invention relates to a laser scanning apparatus suitable for an image forming apparatus such as a printer and a copying machine with an electrophotographic system respectively, and in particular, to the emission control of a laser beam at the time of starting the laser scanning apparatus.

2. Related Background Art

Conventionally, in a laser beam printer which drives a rotary polygon mirror on the basis of a horizontal synchronizing signal (hereinafter, this is called a BD signal), for example, a method of performing configuration and control as disclosed in Japanese Patent Application Laid-Open No. 08-183198 is known.

That is, the rotation control of the rotary polygon mirror is performed by measuring a cycle of a horizontal synchronizing signal between adjacent BD signals, and determining the emission timing of a laser beam for acquiring a next BD signal every horizontal synchronization from the BD cycle measured.

Another method is also known, the method where this timing control is performed during start to the steady rotation of a rotary polygon mirror as well as the steady rotation so as to prevent the degradation of a photosensitive drum by not irradiating a photosensitive drum surface with a laser beam as much as possible, and to prolong the life time of a laser by shortening its lighting time.

However, it is necessary to change the lighting timing of the laser in real time in the above-described conventional example, even when a BD cycle greatly differ from the steady rotation not only under steady rotation but also under start.

Thus, this means that it is necessary to compute the optimal timing in real time every input of the BD signal so as not to emit the laser beam on a photosensitive drum surface. Hence, there is a problem that constitution and control become complicated.

SUMMARY OF THE INVENTION

The present invention is made under such circumstances. An object of the present invention is to provide a laser scanning apparatus that can prevent the degradation of a photosensitive drum and can prolong the life time of a laser by suppressing the unnecessary emission of a laser beam to the photosensitive drum with the simple configuration for timing control, an image forming apparatus using this laser scanning apparatus, and a method of starting the laser scanning apparatus.

The laser scanning apparatus of the present invention is characterized by comprising a rotary polygon mirror for scanning a laser beam, synchronizing signal generating means for detecting the laser beam scanned by the rotary polygon mirror and generating a synchronizing signal, measuring means for measuring a cycle of the synchronizing signal generated by the synchronizing signal generating means, laser emission control means for making a laser beam emitted in order to acquire a synchronizing signal for next scan, start speed measuring means for measuring increasing speed of rotation of the rotary polygon mirror from the cycle of the synchronizing signal measured by the measuring means in an early stage of starting rotation of the rotary polygon mirror, start time prediction means for predicting start time required for the rotary polygon mirror to attain steady rotation on the basis of information from the start speed measuring means, and control means for making a laser beam not emitted until the time predicted by the start time prediction means elapses from measurement completion by the start speed measuring means, making the laser beam emitted after the predicted time elapses, and operably controlling the laser emission control means when the cycle of the synchronizing signal measured by the measuring means reaches a predetermined cycle.

Other objects, configuration, and effects of the present invention will become apparent from the following detailed description taken in connection with the accompany drawings.

DETAILED DESCRIPTION OF THE PREFERRED EMBODIMENTS

Hereinafter, embodiments of the present invention will be described with embodiments of a laser beam printer in detail. In addition, the present invention can be applied to not only the form of an apparatus but also the form of a method of starting a laser scanning apparatus by being backed by the explanation of the embodiments.

(Embodiment 1)

Figure 1:
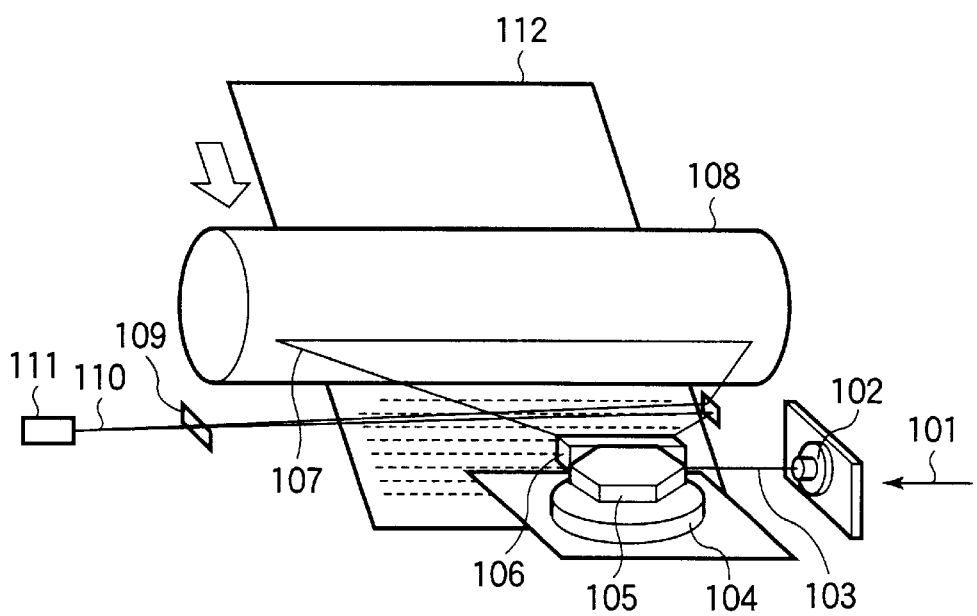
FIG. 1 is a perspective view of a configuration of a first embodiment.

FIG. 1 shows the configuration of a "laser beam printer" of a first embodiment. The image formative operation of the laser beam printer will be described on the basis of FIG. 1. An image signal (VDO signal) 101 is inputted into a laser unit 102. The above-described laser unit 102 generates a laser beam 103 ON/OFF-modulated. A scanner motor 104 makes a rotary polygon mirror 105 steadily rotate. An image formation lens 106 makes a laser beam 107, which is deflected by the rotary polygon mirror 105, focused on a photosensitive drum 108 that is a scan plane. It is assumed in this embodiment that a rotary polygon mirror with six planes is used.

Therefore, the laser beam 107 modulated by the image signal 101 is horizontally scanned (scanning in the direction of the horizontal scanning) on the photosensitive drum 108. A beam detection hole 109 admits the laser beam 107 from a slit-like incident hole. The laser beam 107 entering from this incident hole 109 is led to a photoelectric transducer 111 through the inside of an optical fiber 110. The laser beam transformed into an electric signal by the photoelectric transducer 111 serves as a horizontal synchronizing signal BD after being amplified by an amplifier (not shown). A latent image formed on the photosensitive drum 108 becomes a toner image visualized by a development unit (not shown), which is transferred on transfer paper 112 by a transferring unit (not shown).

Next, control signals for image formation will be described with using FIG. 2.

An image is formed on transfer paper 121. A toner image is formed on this transfer paper 121. Nevertheless, lest the toner image formed should protrude from the transfer paper 121 due to the deviation of the transfer paper 121 etc., an area (image formation area) 122 which can be exposed by the laser beam is provided. Moreover, an image controller (not shown) outputs a picture signal 126. In many cases, each image controller is a controller, being different from a control unit handling control signals such as a BD signal, or an external computer. In such configuration, also in order to make a photosensitive member not exposed even if the image controller turns on an image signal in a non-image area, the image formation area 122 is provided. Therefore, this image formation area 122 will have the size respectively different in accordance with the size of the transfer paper 121.

Next, an image formation signal at the time of forming an image equivalent to one horizontal scanning 123 on the transfer paper 121 will be described. The BD signal 124 is a synchronizing signal in the direction of the horizontal scanning that is described previously, and other signals are generated with synchronizing with this BD signal.

A mask signal 125 is turned on or off according to the mask area 122 on the transfer paper 121. Owing to this, the image signal 126 having image information is forbidden, and the exposure out of the image formation area 122 is also forbidden.

A BD allowance signal 127 permits the input of the BD signal. This signal masks the BD signal 124 in order to make a BD signal not received in a predetermined period from the previous BD signal. This prevents the horizontal synchronization from shifting due to noise.

An unblanking signal 128 is a timing signal for making the laser beam 107 forcibly turned on when the laser beam 107 scans the detection hole 109 for the BD signal. Moreover, when the unblanking signal 128 makes the laser beam turned on, sampling and adjustment of the laser quantity is performed for adjusting the laser quantity to a reasonable level.

Figure 3:
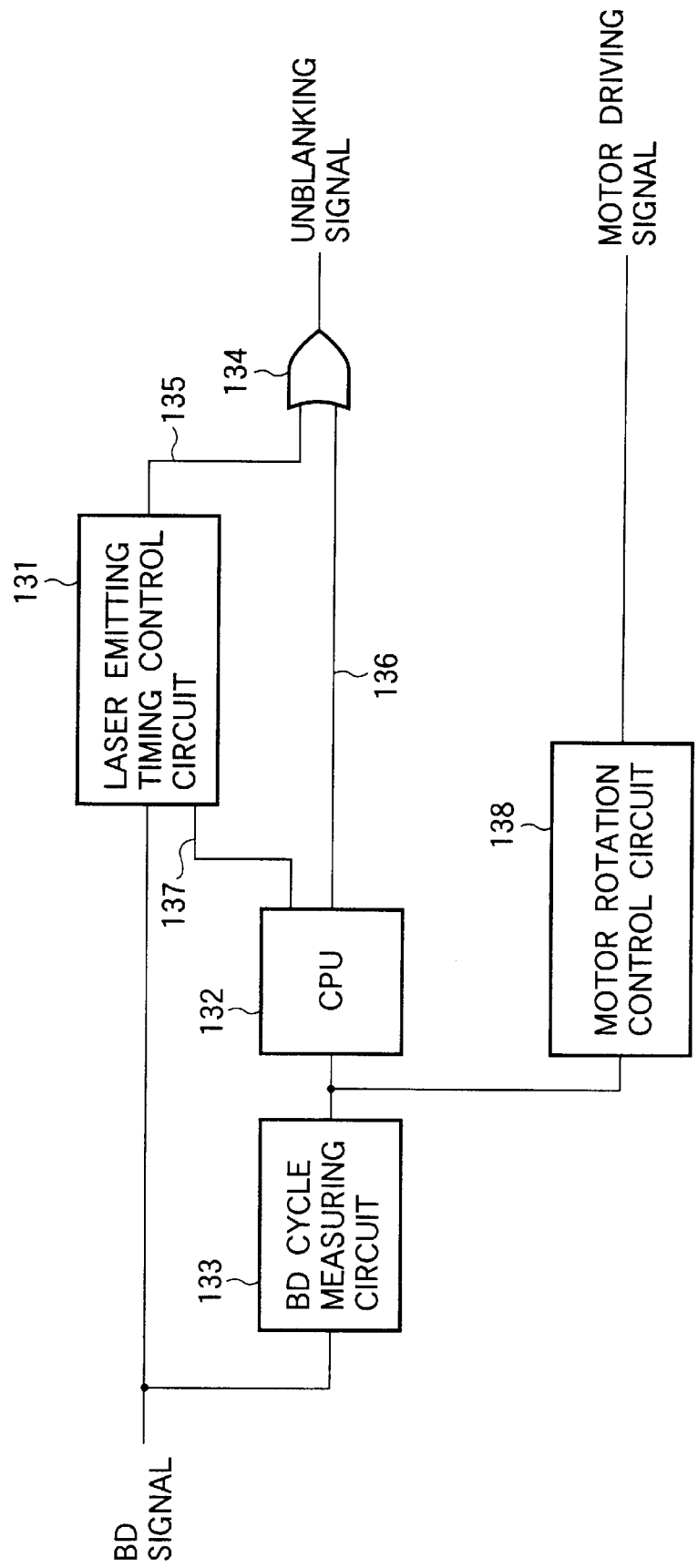
FIG. 3 is a block diagram showing a configuration of an unblanking signal generating circuit etc.

FIG. 3 shows the configuration of an unblanking signal generating circuit and the like. A laser lighting timing control circuit 131 is a timing generation circuit of turning on or off the laser with synchronizing with the BD signal in the predetermined timing from the BD period when the scanner motor 104 is rotating at a predetermined rotation number. For example, supposing that the BD cycle at the time of a predetermined rotation number is 500 µs, the timing generation circuit resets an internal timer when a BD signal is input, turns off the laser at 5 µs after the internal timer is reset, and turns on the laser at 450 µs after the internal timer is reset.

This laser lighting timing control circuit 131 performs the control of not emitting the laser beam to the photosensitive drum 108 and turning on the laser in the vicinity of the timing when the BD signal can be acquired.

Moreover, the laser lighting timing control circuit 131 can be enabled or disabled with a signal 137 from a CPU132.

The CPU132 controls the paper feed and the like in the laser beam printer. This CPU132 can also output the signal 136 for forcibly turning on the laser.

That is, the laser lighting timing control circuit 131 (signal 135) and the CPU 132 (signal 136) can generate the unblanking signal. A signal generated by synthesizing them by an OR circuit 134 turns into the unblanking signal.

A BD cycle measuring circuit 133 measures a cycle from a certain BD signal pulse to the following BD signal pulse, and outputs the result to the CPU 132. Owing to this, the CPU 132 can detect the BD cycle, i.e., the rotation number of the scanner motor 104 in real time.

Moreover, the motor roll control circuit 138 controls the rotation number of the scanner motor 104 on the basis of this BD cycle. If the BD cycle measured in the BD cycle measuring circuit 133 is slower than a predetermined cycle, the motor roll control circuit 138 outputs a signal for accelerating the scanner motor 104, and if faster than the predetermined cycle, the motor roll control circuit 138 outputs a signal for making the scanner motor 104 slow down.

In the laser beam printer configured as described above, as shown in FIGS. 4 and 5, the start control of the unblanking signal is performed.

Figure 4:
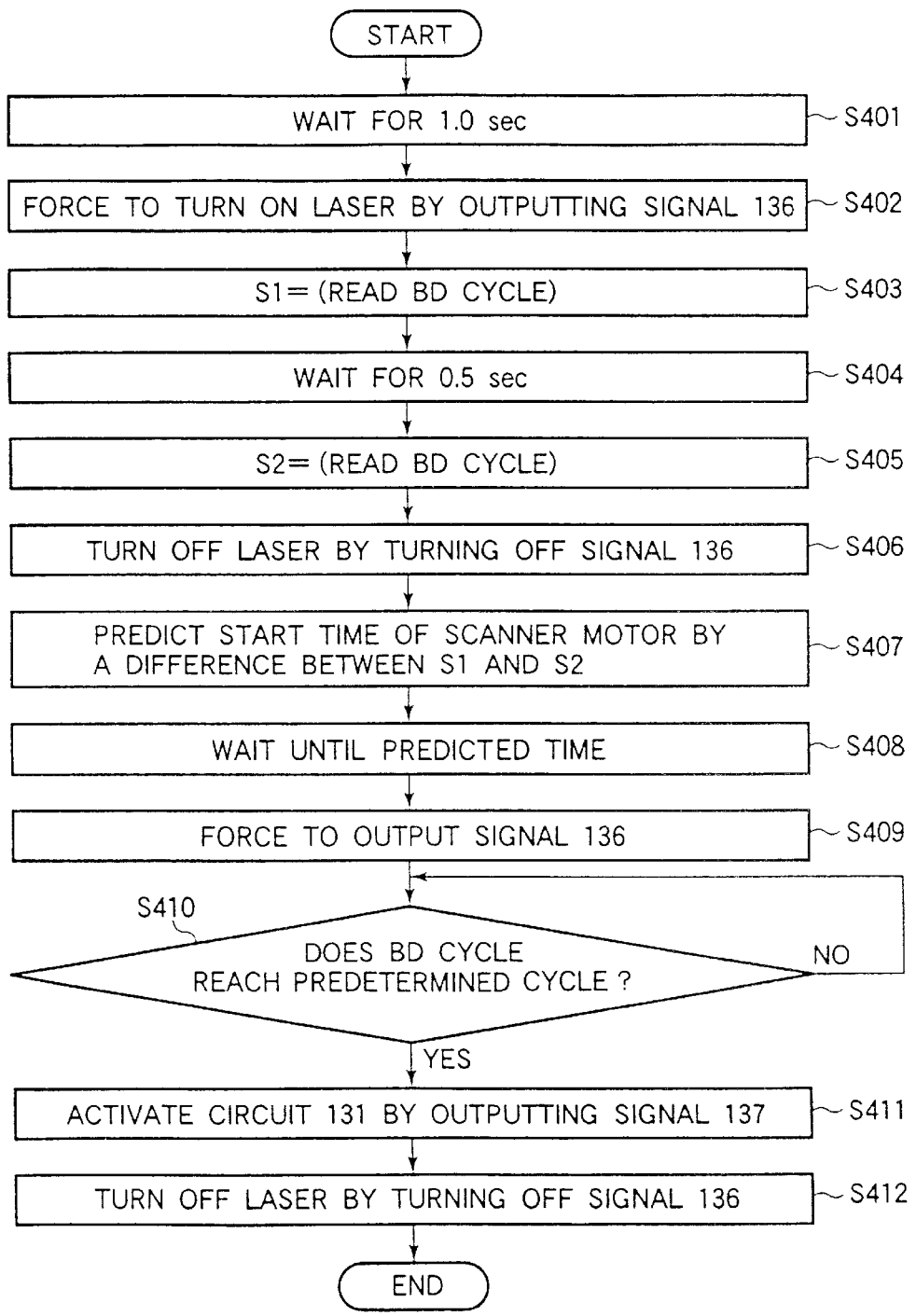
FIG. 4 is a flow chart that shows the start control timing of a scanner motor.
Figure 5:
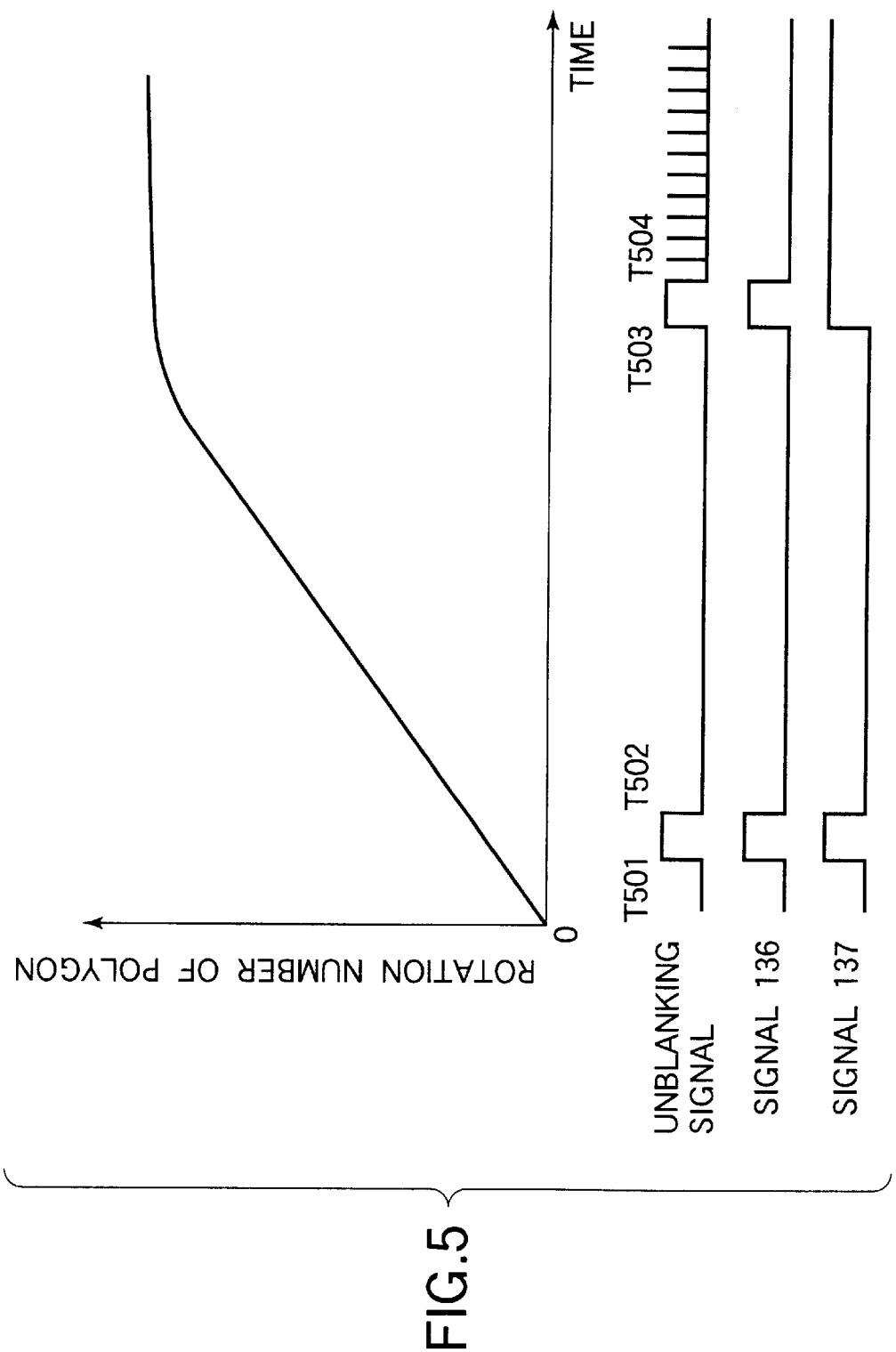
FIG. 5 is a timing chart showing the change of the rotation number of a scanner motor and the change of an unblanking signal etc.

FIG. 4 is a flow chart showing the start control of the scanner motor. FIG. 5 is a timing chart showing the change of the rotation number of the scanner motor 104 and the change of the unblanking signal.

The start control (control in the flow chart shown in FIG. 4) of the scanner motor 104 is started at the same time when the rotation control of the scanner motor 104 is started. When started, a 1.0-sec wait is first performed (see step 401; in the figure, step 401 is abbreviated to S401. This manner is applied to all steps in this specification and drawings. This is a wait for predicting the start time of the rotation number, described later, with more sufficient precision. After the wait, the CPU 132 outputs the signal 136 to forcibly turning on the laser (step 402, timing T501). Then, the BD cycle measuring circuit 133 measures the BD cycle, and fetches the data into the CPU 132 to assign the data to variable S1 (step 403). After waiting for such a time that the increase of the rotation number of the scanner motor 104 can be measured, that is, 0.5 sec in this embodiment (step 404), the BD cycle measuring circuit 133 measures a BD cycle again, and fetches the data into the CPU 132 to assign the data to variable S2 (step 405). Then, by turning off the signal 136, the unblanking signal is turned off for the laser to be turned off (step 406, timing T502).

A time elapsing until reaching a predetermined rotation number is predicted from the rotation number S1 of the scanner motor after 1.0 sec from the start of the scanner and the rotation number S2 after 1.5 sec. In this embodiment, the time is predicted in direct proportion from rotation numbers S1 and S2. For example, suppose that the predetermined rotation number is 20000 rpm, S1=2.50 ms, and S2=1.67 ms. Since this is the BD cycle of a hexahedron, the rotation number of the scanner motor 104 are 4000 rpm at the timing T501 and 6000 rpm at the timing T502. An increasing part of the rotation number during 0.5 sec in this time interval is 2000 rpm. Supposing the rotation number increases by this rate, the rotation number will become at 20000 rpm after 3.5 sec from timing T502.

Then, a wait is performed until the predicted start time (step 408). For example, the wait is performed for the above-described predicted time, 3.5 sec. When this time elapses, the signal 136 is turned on and the laser is made to forcibly turn on (step 409, timing T503). Then, the CPU 132 monitors the BD cycle measured in the BD cycle measuring circuit 133 about whether the BD cycle reaches the predetermined cycle (step 410). When reaching the predetermined rotation number, the CPU 132 outputs the signal 137 to enable the laser lighting timing control circuit 131 (step 411). Simultaneously, the signal 136 is turned off and the forcible lighting of the laser is terminated by the CPU 132 (step 412, timing T504). Owing to this, it becomes possible to output the unblanking signal only in the vicinity of the timing when the BD signal can be fetched with synchronizing with the BD signal as shown in the FIG. 2. Then, the start control of the scanner motor 104 is terminated.

As described above, it is possible in this embodiment to simplify the configuration for the timing control for acquiring a BD signal. At the same time, it is possible to suppress the emission of a laser beam to a photosensitive drum surface at the time of starting to the minimum, and to suppress the emission of the laser beam beyond the need for the photosensitive drum. Hence, the degradation of the photosensitive drum can be prevented, and the lifetime of a laser can be prolonged.

(Embodiment 2)

A "laser beam printer" which is a second embodiment will be described with using FIGS. 6 and 7.

Figure 2:
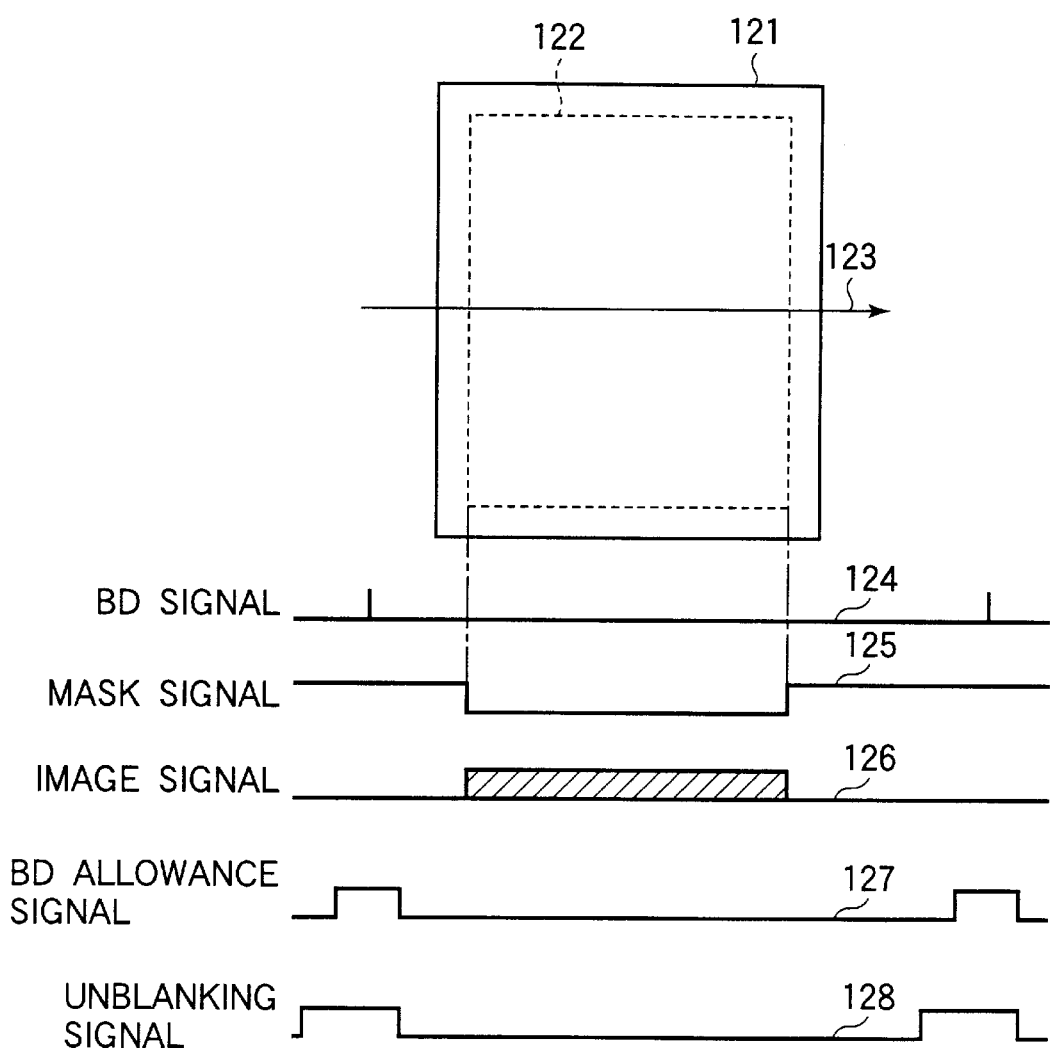
FIG. 2 is a timing chart of signals in a horizontal scanning direction.

Since the hardware configuration of the laser beam printer in this embodiment is the same as that of the first embodiment, FIGS. 1 to 3, and description thereof will be also used in this embodiment for the description to be omitted here.

Figure 6:
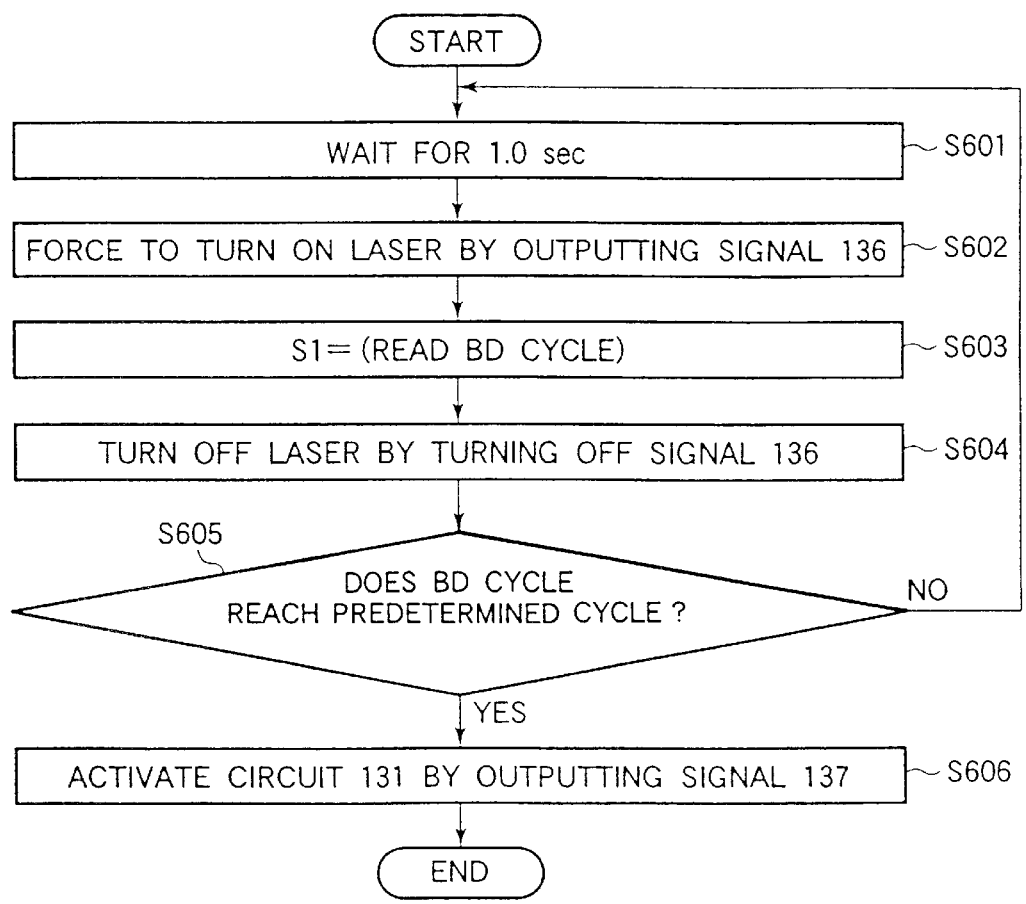
FIG. 6 is a flow chart showing the start control of a scanner motor in a second embodiment.
Figure 7:
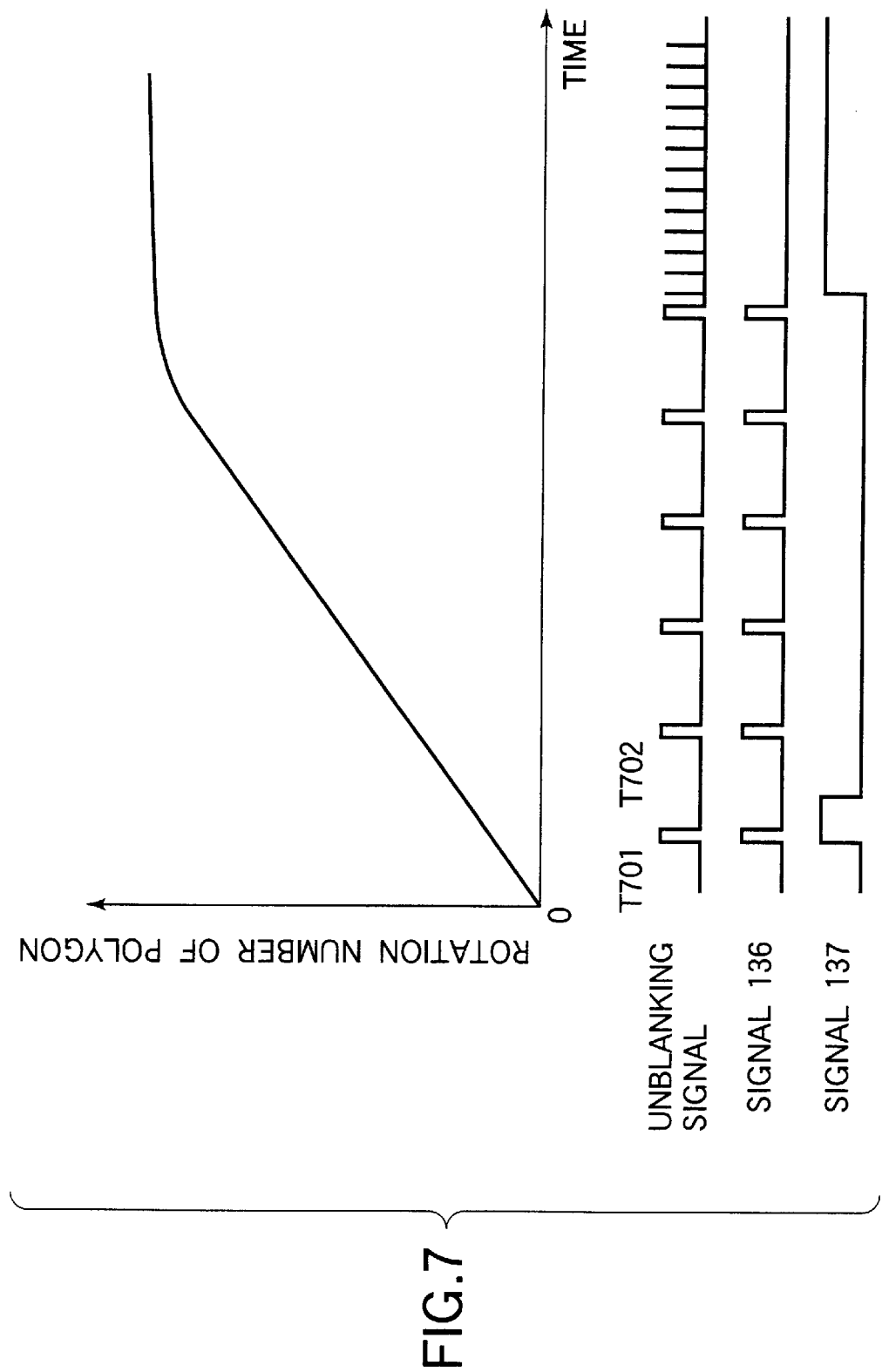
FIG. 7 is a timing chart showing the change of the rotation number of a scanner motor and the change of an unblanking signal etc.

In this embodiment, as shown in FIGS. 6 and 7, the start control of an unblanking signal is performed.

FIG. 6 is a flow chart showing the start control of the scanner motor 104. FIG. 7 is a timing chart showing the change of the rotation number of the scanner motor 104 and the change of the unblanking signal.

The start control of the scanner motor 104 (control in the flow chart shown in FIG. 6) is started at the same time when the rotation control of the scanner motor 104 is started. After the start, first, a 1.0-sec wait is performed (step 601). After the wait, the CPU 132 outputs the signal 136 to forcibly turning on the laser (step 602, timing T701). Then, the BD cycle measuring circuit 133 measures a BD cycle, and fetches the data into the CPU 132 to assign the data to variable S1 (step 603). Further, by turning off the signal 136, the unblanking signal is turned off for the laser to be turned off (step 604, timing T702). Therefore, the laser is turned on only for the very short time when the BD cycle can be acquired.

It is confirmed whether the cycle of variable S1 reaches a predetermined BD cycle (Step 605). If not reaching the predetermined cycle, the steps are repeated from the 1.0-sec wait at step 601.

Thus, until the rotation of the scanner motor 104 reaches the predetermined rotation number, the laser is turned on only for the slight time every 1.0 sec.

When the scanner motor 104 reaches the predetermined rotation number, the CPU 132 outputs the signal 137 to enable the output of the signal 135 in the laser lighting timing control circuit 131 (step 606). Hence, an unblanking signal 128 is outputted only in the vicinity of the timing when the BD signal can be acquired with synchronizing with the BD signal 124 as shown in the FIG. 2. Then, the start control of the scanner motor 104 is terminated.

As described above, in this embodiment, even if it is difficult to predict the start time of a scanner motor, it is possible to simplify the configuration for timing control for acquiring a BD signal. At the same time, it is possible to suppress the emission of a laser beam to a photosensitive drum surface at the time of starting to the minimum, and to suppress the unnecessary emission of the laser beam for the photosensitive drum. Hence, the degradation of the photosensitive drum can be prevented, and the lifetime of a laser can be prolonged.

As described above, according to this embodiment, it is possible with using simpler configuration to suppress the unnecessary emission of a laser beam for a photosensitive drum, to prevent the degradation of the photosensitive drum, and to prolong the lifetime of a laser.

While several preferred embodiments have been described above, it is to be understood that changes and variations may be made without departing from the sprit on scope of the following claims.

What is claimed is:

1. A laser scanning apparatus comprising:

a scanning unit for scanning a laser beam;

a receiver for receiving the laser beam and generating a BD signal;

a measuring unit for measuring a scanning cycle of said scanning unit based on the BD signal generated by said receiver;

a controller for controlling emission of the laser beam and controlling a motor of said scanning unit based on the scanning cycle measurement, wherein during a start-up period in which the scanning cycle of said scanning unit gradually shortens, said controller causes continuous emission of the laser beam for a first period during which the scanning cycle can be measured, predicts a time when a scanning speed of said scanning unit will reach a predetermined speed based on the scanning cycle measurement, terminates emission of the laser beam until the predicted time, and causes continuous emission of the laser beam for a second period during which the scanning cycle can be measured after the predicted time.

2. A laser scanning apparatus according to claim 1, wherein said measuring unit measures the scanning cycle based on the BD signal generated by said receiver twice during the first period, and wherein said controller predicts the time when the scanning speed of said scanning unit will reach the predetermined speed based on the increasing degree of the two scanning cycle measurements.

3. A laser scanning apparatus according to claim 1, wherein said scanning unit comprises a polygon mirror for reflecting the laser beam and a motor for rotating the polygon mirror.

4. A laser scanning apparatus according to claim 1, wherein said controller determines if a scanning speed of said scanning unit reaches the predetermined speed based on the scanning cycle measurement during the second period.

5. A laser scanning apparatus according to claim 4, further comprising an unblanking signal generator for generating an unblanking signal for forcing emission of the laser beam when the laser beam is scanned near said receiver, wherein said controller activates said unblanking signal generator when the scanning speed of said scanning unit reaches the predetermined speed.

6. An image forming apparatus comprising a laser scanning apparatus, said laser scanning apparatus comprising:
- a scanning unit for scanning a laser beam;
- a receiver for receiving the laser beam and generating a BD signal;
- a measuring unit for measuring a scanning cycle of said scanning unit based on the BD signal generated by said receiver;
- a controller for controlling emission of the laser beam and controlling a motor of said scanning unit based on the scanning cycle measurement,
- wherein during a start-up period in which the scanning cycle of said scanning unit gradually shortens, said controller causes continuous emission of the laser beam for a first period during which the scanning cycle can be measured, predicts a time when a scanning speed of said scanning unit will reach a predetermined speed based on the scanning cycle measurement, terminates emission of the laser beam until the predicted time, and causes continuous emission of the laser beam for a second period during which the scanning cycle can be measured after the predicted time.

7. A start-up method of a laser scanning apparatus for scanning a laser beam on a path passing through a beam detector, which receives the laser beam and generates a BD signal, during a start-up period in which a scanning cycle of the laser scanning apparatus gradually shortens, the method comprising the steps of:
- emitting the laser beam continuously for a first period during which the scanning cycle can be measured;
- measuring the scanning cycle based on the BD signal generated by the beam detector;
- predicting a time when a scanning speed of the laser scanning apparatus will reach a predetermined speed based on the scanning cycle measured in said measuring step;
- terminating emission of the laser beam until the time predicted in said predicting step; and
- emitting the laser beam continuously for a second period during which the scanning cycle can be measured after the predicted time.

* * * * *